US009703440B2

(12) United States Patent
Li et al.

(10) Patent No.: US 9,703,440 B2
(45) Date of Patent: Jul. 11, 2017

(54) SELF-CAPACITIVE TOUCH DISPLAY PANEL AND ARRAY SUBSTRATE THEREOF

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN); Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 34 days.

(21) Appl. No.: 14/962,969

(22) Filed: Dec. 8, 2015

(65) Prior Publication Data

US 2016/0291724 A1 Oct. 6, 2016

(30) Foreign Application Priority Data

Apr. 1, 2015 (CN) .......................... 2015 1 0152854

(51) Int. Cl.
*G06F 3/044* (2006.01)
*G06F 3/041* (2006.01)
*G02F 1/1362* (2006.01)
*G02F 1/1333* (2006.01)

(52) U.S. Cl.
CPC ........ *G06F 3/044* (2013.01); *G02F 1/136286* (2013.01); *G06F 3/0412* (2013.01); *G06F 3/0416* (2013.01); *G02F 1/13338* (2013.01)

(58) Field of Classification Search
CPC ...................................................... G06F 3/044
See application file for complete search history.

(56) References Cited

U.S. PATENT DOCUMENTS 9,507,463 B2 * 11/2016 Yang ..................... G06F 3/0412
2008/0062140 A1 * 3/2008 Hotelling ............. G09G 3/3648
345/173

(Continued)

FOREIGN PATENT DOCUMENTS

CN 102339185 A 2/2012

*Primary Examiner* — Gene W Lee
(74) *Attorney, Agent, or Firm* — Alston & Bird LLP (57) ABSTRACT

A self-capacitive touch display panel and an array substrate thereof are provided in the disclosure. The array substrate includes a substrate, where gate lines, data lines, and a common electrode layer are provided on the substrate, and the gate lines and the data lines are insulated from each other and cross each other to define a plurality of pixel units arranged in an array; the pixel unit includes a pixel thin film transistor and a pixel electrode; the common electrode layer includes a plurality of touch-control units; a plurality of touch-control-driving thin film transistors are further provided on the substrate; and the touch-control unit is connected to drains of at least two touch-control-driving thin film transistors, the gates of the two touch-control-driving thin film transistors are connected to different gate lines, and the sources of the two touch-control-driving thin film transistors are connected to different data lines.

17 Claims, 7 Drawing Sheets

(56) References Cited

U.S. PATENT DOCUMENTS

| | | | | |
|---|---|---|---|---|
| 2009/0135158 A1* | 5/2009 | Takahashi | ............... | G06F 3/044 345/174 |
| 2013/0050130 A1* | 2/2013 | Brown | ................... | G06F 3/044 345/174 |
| 2013/0162570 A1* | 6/2013 | Shin | ........................ | G06F 3/041 345/173 |
| 2016/0011705 A1* | 1/2016 | Huang | ................... | G06F 3/044 345/174 |
| 2016/0187694 A1* | 6/2016 | Kim | ..................... | G06F 3/0412 349/12 |
| 2016/0291777 A1* | 10/2016 | Xi | ........................ | G06F 3/0416 |
| 2016/0328059 A1* | 11/2016 | Wang | ..................... | G06F 3/044 |

* cited by examiner

SELF-CAPACITIVE TOUCH DISPLAY PANEL AND ARRAY SUBSTRATE THEREOF

CROSS REFERENCE TO RELATED APPLICATION

The present application claims the priority to Chinese Patent Application No. 201510152854.6, titled "SELF-CAPACITIVE TOUCH DISPLAY PANEL AND ARRAY SUBSTRATE THEREOF", filed on Apr. 1, 2015 with the State Intellectual Property Office of People's Republic of China, which is incorporated herein by reference in its entirety.

TECHNICAL FIELD

The disclosure relates to the field of touch display technology, and in particular to a self-capacitive touch display panel and an array substrate thereof.

BACKGROUND OF THE INVENTION

In the initial developing stage of touch display, a touch display panel is formed by the lamination of a touch panel and a display panel. The touch panel and display panel need to be manufactured separately, which results in high cost, large thickness, and low production efficiency.

With the development of self-capacitive touch display technology, the common electrode of array substrate in a display panel may be also used as a touch-control sensing electrode to perform touch-control and display-control in a time-sharing mode through time-sharing driving. Thus, through integrating the touch-control sensing electrode in the display panel directly, fabrication cost is greatly reduced, production efficiency is improved, and thickness of the panel is reduced.

In a case that the common electrode doubles as the touch-control sensing electrode, the common electrode layer needs to be partitioned into a plurality of common electrode blocks. Meanwhile, to achieve the time-sharing control of touch and display, a separate wire is needed for each common electrode block to provide signals. Through the wire, a touch-control sensing signal is provided for the corresponding common electrode block in the touch-control period, and a display-driving voltage is provided for the corresponding common electrode block in the display period.

For a conventional self-capacitive touch display panel, it is generally required to deposit a separate metal layer, and wires for the touch-control unit are fabricated throughout the metal layer, which results in a complex fabrication process for the self-capacitive touch display panel at a high cost. Furthermore, the thickness of the panel is increased due to the separate wiring layer.

BRIEF SUMMARY OF THE INVENTION

In view of this, a self-capacitive touch display panel and an array substrate thereof are provided according to the embodiments of the disclosure, whereby the fabrication process is simplified, and the cost and panel thickness are reduced.

To achieve the forgoing objectives, the following technical solutions are provided.

In one embodiment, an array substrate for a self-capacitive touch display panel, includes: a substrate, where a plurality of gate lines, a plurality of data lines, and a common electrode layer are provided on the substrate, and the gate lines and the data lines are insulated from each other and cross each other to define a plurality of pixel units arranged in an array. The pixel unit includes a pixel thin film transistor and a pixel electrode; the common electrode layer includes a plurality of touch-control units insulated from each other, and each touch-control unit corresponds to a plurality of pixel units; a plurality of touch-control-driving thin film transistors are further provided on the substrate; and each touch-control unit is connected to drains of at least two touch-control-driving thin film transistors, the gates of the two touch-control-driving thin film transistors are connected to different gate lines, and the sources of the two touch-control-driving thin film transistors are connected to different data lines.

In accordance with an exemplary embodiment, in the forgoing array substrate, the plurality of touch-control units is arranged in an array.

In accordance with an exemplary embodiment, in the forgoing array substrate, at most one touch-control-driving thin film transistor is provided accordingly in one pixel unit.

In accordance with an exemplary embodiment, in the forgoing array substrate, for each pixel unit, the gate of the pixel thin film transistor is connected to an adjacent gate line, the source of the pixel thin film transistor is connected to an adjacent data line, and the drain of the pixel thin film transistor is connected to a pixel electrode. The touch-control-driving thin film transistor and the pixel thin film transistor connected to a same data line are provided on two sides of the data line respectively or on the same side of the data line.

In accordance with an exemplary embodiment, in the forgoing array substrate, the common electrode layer is provided between the pixel electrode and the substrate; or the pixel electrode is provided between the common electrode layer and the substrate.

In accordance with an exemplary embodiment, in the forgoing array substrate, the touch-control-driving thin film transistor and the pixel thin film transistor are provided on the same layer.

In accordance with an exemplary embodiment, in the forgoing array substrate, the turn-on voltages of the touch-control-driving thin film transistor and the pixel thin film transistor connected to a same gate line are different at a same moment.

In accordance with an exemplary embodiment, in the forgoing array substrate, for a same touch-control unit, the data lines connected to the touch-control-driving thin film transistors are arranged consecutively; or, for the same touch-control unit, the data lines connected to the touch-control-driving thin film transistors are arranged at regular intervals.

In accordance with an exemplary embodiment, in the forgoing array substrate, the array substrate includes a red pixel unit, a green pixel unit and a blue pixel unit. The touch-control-driving thin film transistor is provided in the array substrate at the location corresponding to the red pixel unit, or is provided in the array substrate at the location corresponding to the blue pixel unit. A self-capacitive touch display panel is further provided in the disclosure. The self-capacitive touch display panel includes: an array substrate and a color film substrate disposed oppositely to the array substrate; and a display medium provided between the array substrate and the color film substrate, where the array substrate is any one of the foregoing array substrates.

In accordance with an exemplary embodiment, in the forgoing self-capacitive touch display panel, the operating time of the touch display panel comprises a display period and a touch-control period. During the touch-control period, the touch-control-driving thin film transistors are turned on, and a touch-control signal is transmitted to the touch-control unit through the touch-control-driving thin film transistors. During the display period, data signals for display are inputted to a plurality of data lines in turn and are transmitted to corresponding pixel electrodes through the pixel thin film transistors, and in a same touch-control unit, at a same moment, at least one data line transmits the common signal to the touch-control unit through the touch-control-driving transistor.

In accordance with an exemplary embodiment, in the forgoing self-capacitive touch display panel, the pixel thin film transistor is NMOS, and the touch-control-driving thin film transistor is PMOS.

In accordance with an exemplary embodiment, in the forgoing self-capacitive touch display panel, during the touch-control period, the PMOS is turned on, and the touch-control signal is transmitted to the touch-control unit through the PMOS. During the display period, the data signals for display are inputted to a plurality of data lines in turn, and are transmitted to corresponding pixel electrodes through the NMOS, and in a same touch-control unit, at the same moment, at least one data line transmits the common signal to the touch-control unit through the PMOS.

In accordance with an exemplary embodiment, in the forgoing self-capacitive touch display panel, the pixel thin film transistor is PMOS, and the touch-control-driving thin film transistor is NMOS.

In accordance with an exemplary embodiment, in the forgoing self-capacitive touch display panel, during the touch-control period, the NMOS is turned on, and the touch-control signal is transmitted to the touch-control unit through the NMOS. During the display period, the data signals for display are inputted to a plurality of data lines in turn and are transmitted to corresponding pixel electrodes through the PMOS, and in the same touch-control unit, at the same moment, at least one data line transmits the common signal to the touch-control unit through the NMOS.

In accordance with an exemplary embodiment, in the forgoing self-capacitive touch display panel, during the display period: when the data signal for display is provided, through one data line connected to the touch-control-driving thin film transistor, to a corresponding touch-control unit, the common signal is inputted to other data lines connected to the touch-control-driving thin film transistor simultaneously; and there is no data line connected to the touch-control-driving thin film transistor providing the data signal for display to the corresponding touch-control unit, the common signal is inputted to all the data lines connected to the touch-control-driving thin film transistor simultaneously.

It can be realized from the forgoing description that, the array substrate according to the embodiments of the disclosure includes: a substrate, where a plurality of gate lines, a plurality of data lines, and a common electrode layer are provided on the substrate, and the gate lines and the data lines are insulated from each other and cross each other to define a plurality of pixel units arranged in an array; the pixel unit includes a pixel thin film transistor and a pixel electrode; the common electrode layer includes a plurality of touch-control units insulated from each other, and each touch-control unit corresponds to a plurality of pixel units; a plurality of touch-control-driving thin film transistors are further provided on the substrate; and each touch-control unit is connected to drains of at least two touch-control-driving thin film transistors, the gates of the two touch-control-driving thin film transistors are connected to different gate lines, and the sources of the two touch-control-driving thin film transistors are connected to different data lines. The common electrode layer of the array substrate is partitioned into a plurality of touch-control units, and the self-capacitive touch detection may be performed. The data lines of pixel units of the array substrate may be reused as wires for the touch-control units, to provide the common signal or touch-control signal for the touch-control units, thus there is no need to deposit metal layers separately to fabricate the wires for the touch-control units, which simplifies the fabrication process, and reduces the fabrication cost and thickness of the panel.

BRIEF DESCRIPTION OF THE DRAWINGS

In order to illustrate the technical solutions according to the embodiments of the disclosure more clearly, the drawings to be used in the description of the embodiments are described briefly hereinafter. The drawings described hereinafter are only some embodiments of the present disclosure, and other drawings may be obtained by those skilled in the art according to the drawings without any creative effort.

DETAILED DESCRIPTION

Hereinafter, the technical solutions in the embodiments of the present disclosure are described clearly and completely in conjunction with the drawings in the embodiments of the present disclosure. The described embodiments are only a few rather than all of the embodiments of the present disclosure. All the other embodiments obtained by those skilled in the art based on the embodiments of the present disclosure without creative effort fall within the scope of protection of the disclosure.

Figure 1:
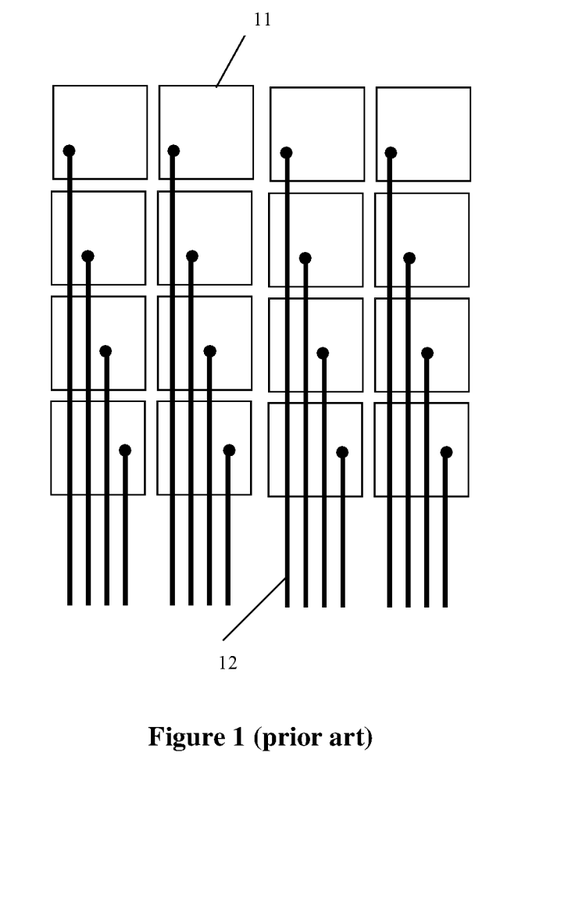
FIG. 1 is a top view of an array substrate constructed with conventional technology.

Referring to FIG. 1, a top view of an array substrate is shown. The array substrate includes a common electrode layer and a wiring layer disposed on a substrate. The common electrode layer and the wiring layer are opposite to each other. The common electrode layer is partitioned into a plurality of touch-control units 11, the wiring layer includes a plurality of wires 12 corresponding to the touch-control units in a one-to-one ratio. The array substrate further includes a plurality of pixel units, a plurality of data lines, and a plurality of gate lines. The pixel unit includes a pixel electrode and a pixel thin film transistor. For sake of simplicity, the plurality of pixel units, the plurality of data lines, and the plurality of gate lines are not shown in FIG. 1.

Figure 2:
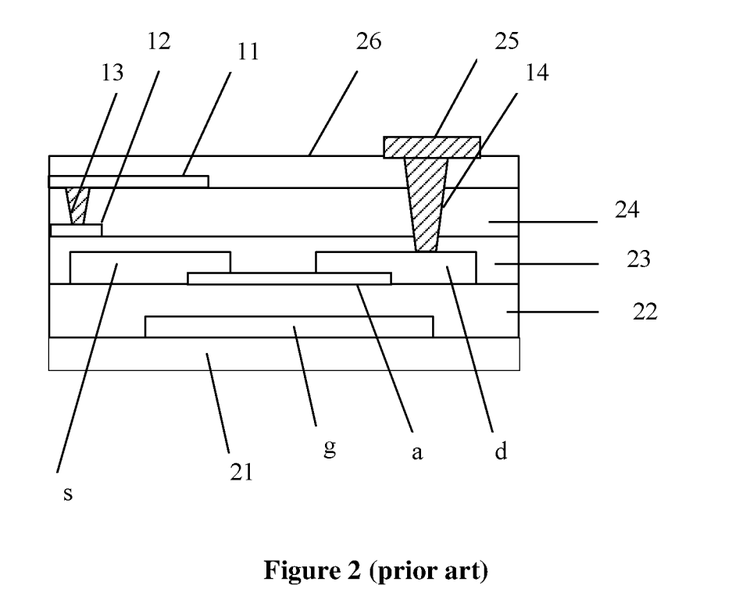
FIG. 2 is a sectional view of the array substrate shown in FIG. 1.

Referring to FIG. 2, a sectional view of the array substrate in FIG. 1 is shown. Pixel thin film transistors, gate lines and data lines are provided on one side of the substrate 21. The gate g of the pixel thin film transistor is provided on the surface of substrate 21, and the gate line (not shown in FIG.

2) is provided on the same layer as the gate g. A gate insulating layer 22 is provided on a surface of the gate line. An active region a, together with a drain d and a source s connected to the active region a are provided on a surface of the gate insulating layer 22. The data line (not shown in FIG. 2) is electrically connected to source s, and the date line may be provided on the same layer as source s or on other layers. A first insulating layer 23 is provided on a surface of source s, drain d and active region a. The wiring layer is provided on a surface of the first insulating layer 23, and the wiring layer includes a plurality of wires 12. A second insulating layer 24 is provided on a surface of a layer of the wires 12 and the first insulating layer 23, and the common electrode layer is provided on a surface of the second insulating layer. The common electrode layer includes a plurality of touch-control units 11 electrically connected to wires 12 in one-to-one correspondence. A third insulating layer 26 is provided on a surface of the common electrode layer away from substrate 21, and a pixel electrode 25 is provided on a surface of the third insulating layer 26 away from substrate 21.

The touch-control unit 11 is electrically connected to the corresponding wire 12 through a via hole 13, and the pixel electrode 25 is electrically connected to the drain d of the pixel thin film transistor in the pixel unit where the pixel electrode 25 locates through a via hole 14.

It can be realized from the forgoing description that in a case that the common electrode layer is used for touch detection, it is required to deposit a wiring layer. Furthermore, it is required to connect a wire for each touch display electrode separately through the wiring layer, which results in a complex fabrication process, a high cost, and an increased thickness of the panel.

In view of these challenges, an array substrate is provided according to the embodiment of the disclosure, which is applied to a self-capacitive touch display panel.

Figure 3:
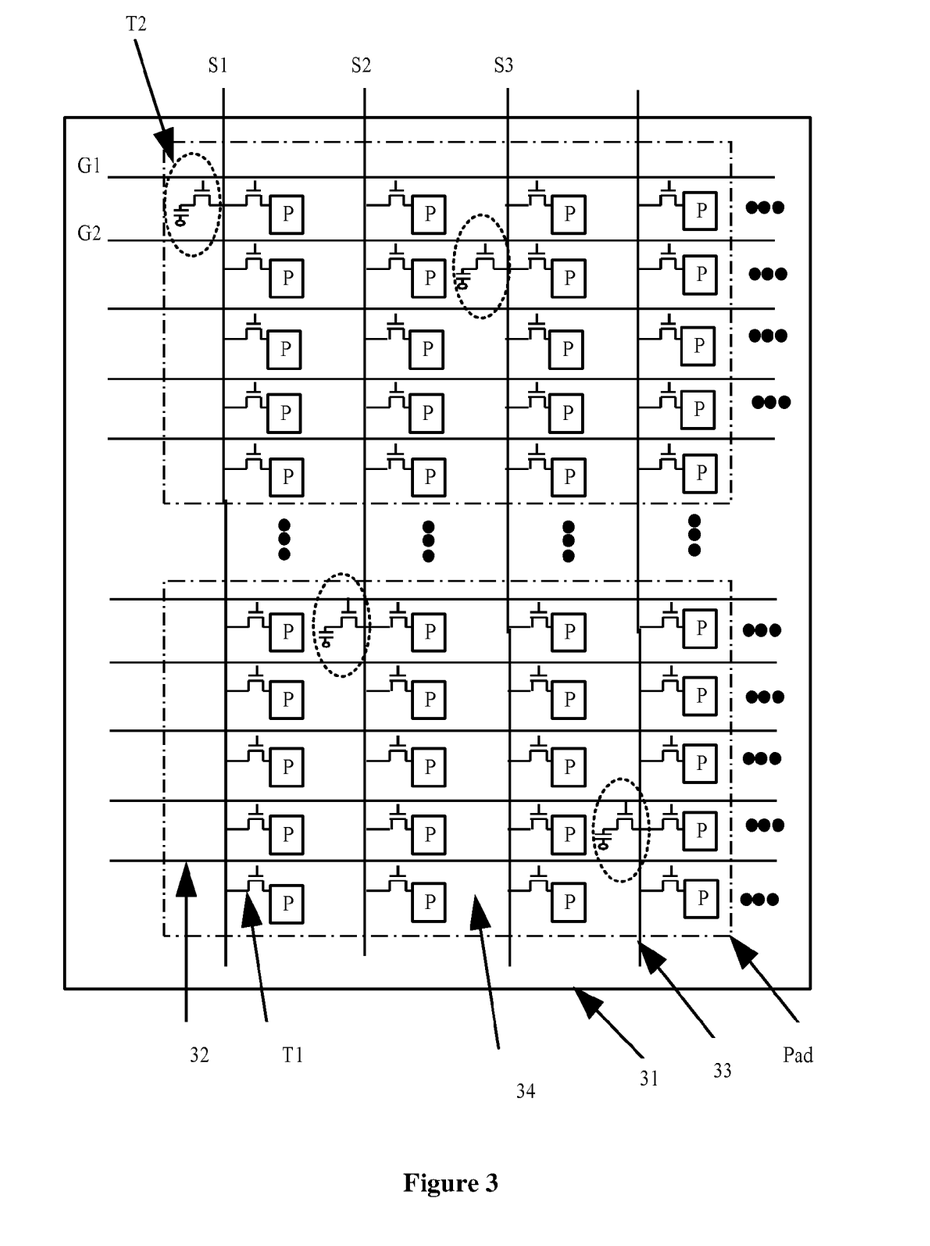
FIG. 3 is a structural diagram of an array substrate according to an embodiment of the disclosure.

Referring to FIG. 3, a structural diagram of an array substrate according to an embodiment of the disclosure is shown. The array substrate includes a substrate 31, where a plurality of gate lines 32, a plurality of data lines 33, and a common electrode layer are provided on the substrate. The gate lines 32 and the data lines 33 are insulated from each other and cross each other to define a plurality of pixel units 34, wherein the plurality of pixel units 34 are arranged in an array. A plurality of touch-control-driving thin film transistors T1 are also provided on the substrate.

The pixel unit includes a pixel thin film transistor T1 and a pixel electrode P. The drain of the pixel thin film transistor T1 is connected to the pixel electrode P.

The gate lines 32 correspond to columns of the pixel units 34 in one-to-one correspondence, the data lines 33 correspond to rows of the pixel units 34 in one-to-one correspondence, the gates of the pixel units 34 in a same row are connected to a same gate line 32, and the sources of the pixel units 34 in a same column are connected to a same data line 33. The gates of the pixel thin film transistors T1 in a same row are connected to a same gate line 32, so that the gates of the pixel units 34 in a same row are connected to a same gate line 32. The sources of the pixel thin film transistors T1 in a same column are connected to a same data line, so that the sources of the pixel units 34 in a same column are connected to a same data line 33.

The common electrode layer includes a plurality of touch-control units Pad insulated from each other, each touch-control unit Pad corresponds to multiple pixel units 34 (i.e., in the direction perpendicular to the substrate 31). The projection of the touch-control unit Pad onto the substrate 31 covers the projection of multiple pixel units 34 onto the substrate 31. The gate of the touch-control-driving thin film transistor T2 is connected to one of the gate lines 32, the source of T2 is connected to one of the data lines 33, and the drain of T2 is connected to one of the touch-control units Pad.

Each touch-control unit Pad is at least connected to the drains of two touch-control-driving thin film transistors T2, the gates of the two touch-control-driving thin film transistors T2 are connected to different gate lines, and the sources of the two touch-control-driving thin film transistors T2 are connected to different data lines. The drains of the touch-control-driving thin film transistors T2 corresponding to a same touch-control unit Pad are all electrically connected to the touch-control unit Pad.

In the implementation shown in FIG. 3, to achieve the time-sharing driving of the image display and touch detection, each touch-control unit Pad is connected to the drains of two touch-control-driving thin film transistors T2.

Figure 4:
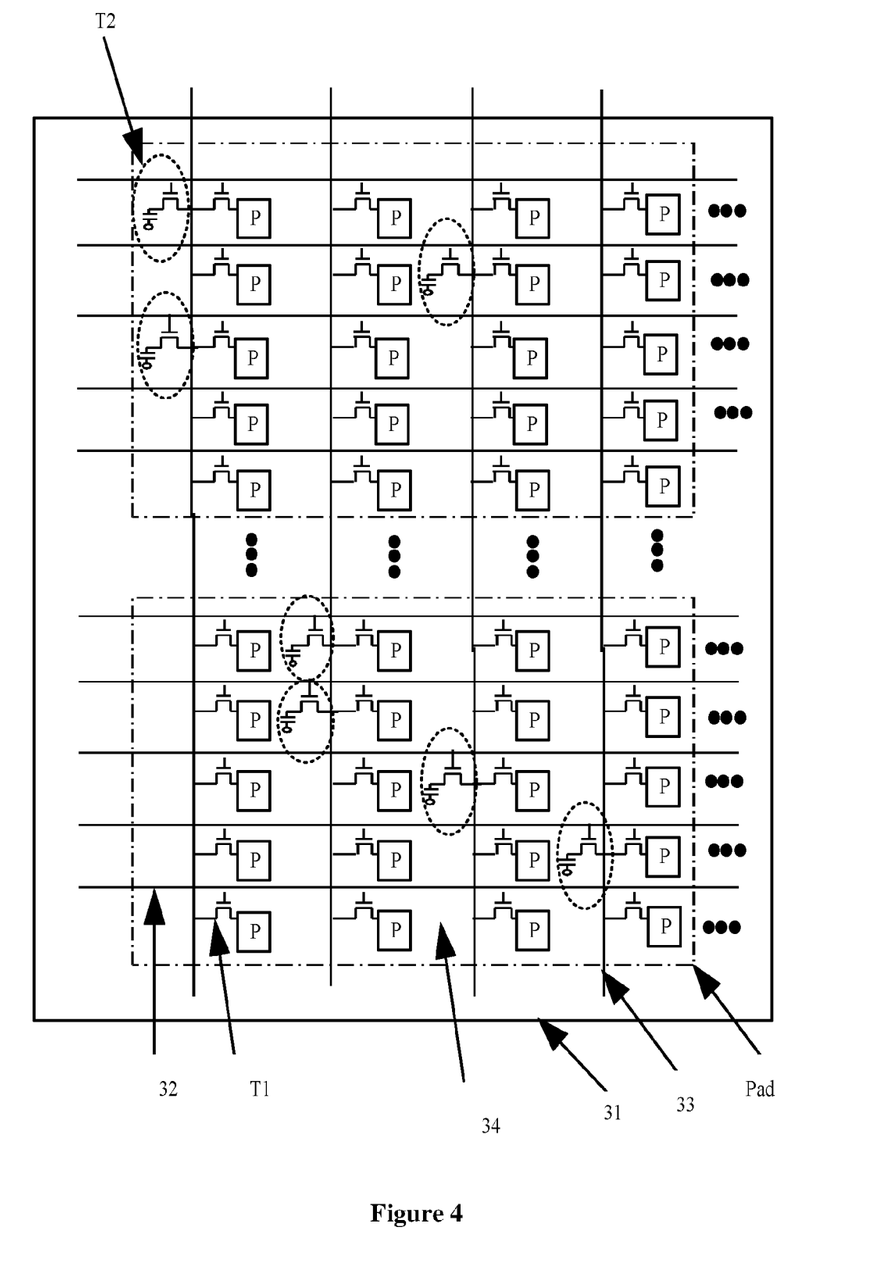
FIG. 4 is a structural diagram of an array substrate according to another embodiment of the disclosure.
Figure 5:
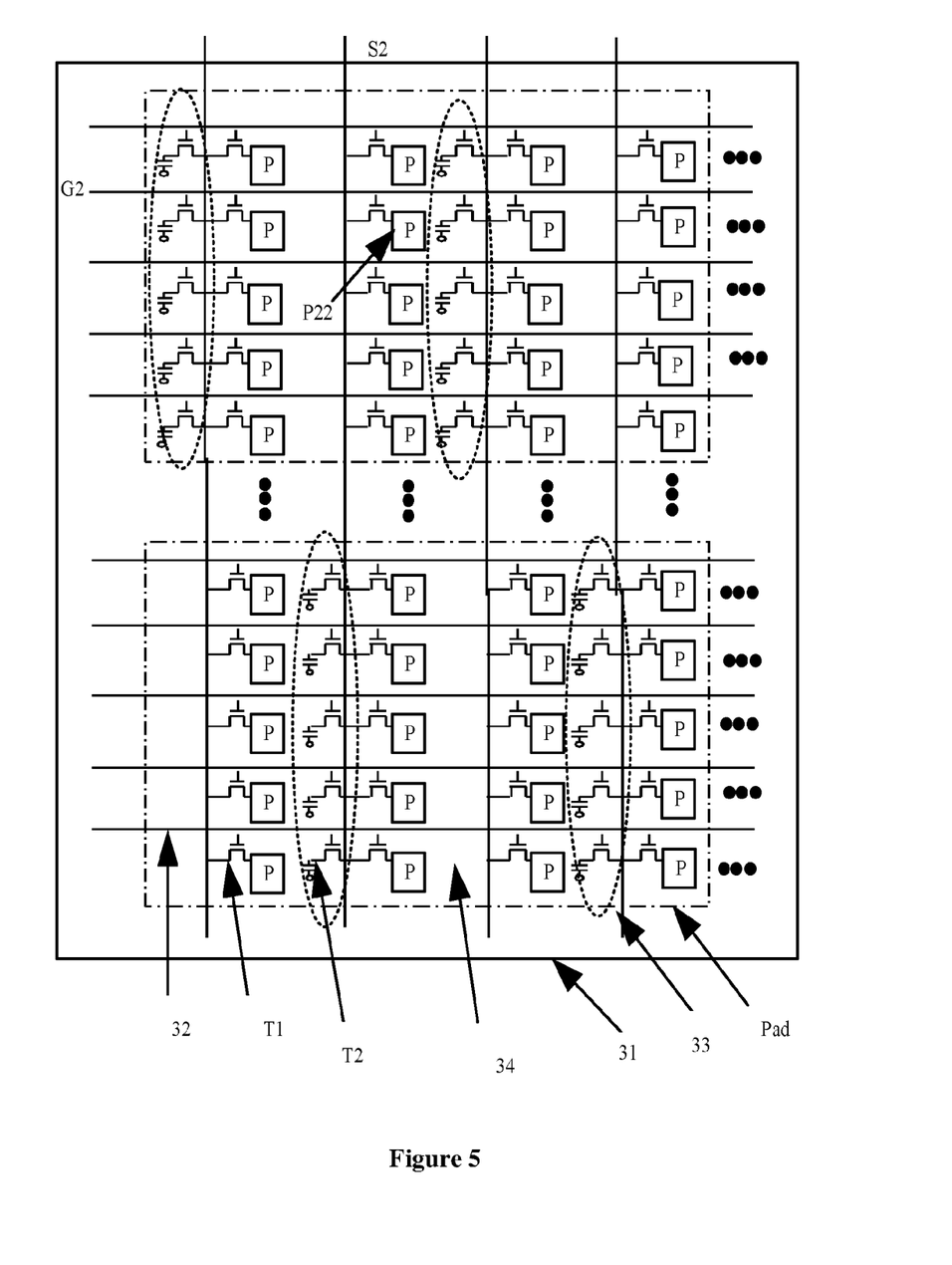
FIG. 5 is a structural diagram of an array substrate according to yet another embodiment of the disclosure.

The array substrate may alternatively have a structure as shown in FIG. 4. FIG. 4 is a structural diagram of an array substrate according to an embodiment of the disclosure. For the touch-control units Pad of the array substrate shown in FIG. 4, each touch-control unit Pad is connected to the drains of three or four touch-control-driving thin film transistors T2. The array substrate may alternatively have a structure as shown in FIG. 5. FIG. 5 is a structural diagram of an array substrate according to an embodiment of the disclosure. In the array substrate shown in FIG. 5, each touch-control unit Pad is connected to the drains of two columns of touch-control-driving thin film transistors T2.

It should be noted that, the dotted ellipses in FIG. 3-FIG. 5 are only to show the locations of the touch-control-driving thin film transistors T2, and are not actual structures that exist. In FIG. 3-FIG. 5, the same reference numbers indicate the same structures. In the array substrate according to the embodiment of the disclosure, the number of touch-control-driving thin film transistors T2 provided in each touch-control unit Pad and the manner for disposing the touch-control-driving thin film transistors T2 are not limited to the implementation in FIG. 3-FIG. 5. Each touch-control unit Pad is connected to the drains of multiple touch-control-driving transistors T2, and for at least two among the multiple touch-control-driving transistors T2, their sources are connected to different data lines 33 and their gates connected to different gate lines 32.

According to the embodiment of the disclosure, each touch-control unit Pad is connected to at least two of the drains of multiple touch-control-driving thin film transistors T2. The gates of thin film transistors T2 are connected to different gate lines, and T2 sources are connected to different data lines.

In the array substrate according to the embodiment of the disclosure, the multiple touch-control units Pad are arranged in an array. The touch-control units Pad may have the same or different shapes. In accordance with an exemplary embodiment, the touch-control units Pad are provided to have the same shape, to allow the pattern design for fabricating the common electrode layer into the touch-control units to be simple.

To ensure the aperture ratio and better light transmission efficiency of each pixel unit 34, it is set that at most one touch-control-driving thin film transistor T2 is provided to correspond to a pixel unit 34. The touch-control-driving thin film transistors T2 and the pixel thin film transistor T1 connected to a same data line 33 are provided on two sides of the data line 33. At most one touch-control-driving thin film transistor T2 is provided in a same pixel unit 34.

In each pixel unit 34, the gate of the pixel thin film transistor T1 is connected to the adjacent gate line 32, the source of the pixel thin film transistor T1 is connected to the adjacent data line 33, and the drain of the pixel thin film transistor T1 is connected to the pixel electrode P.

Figure 6:
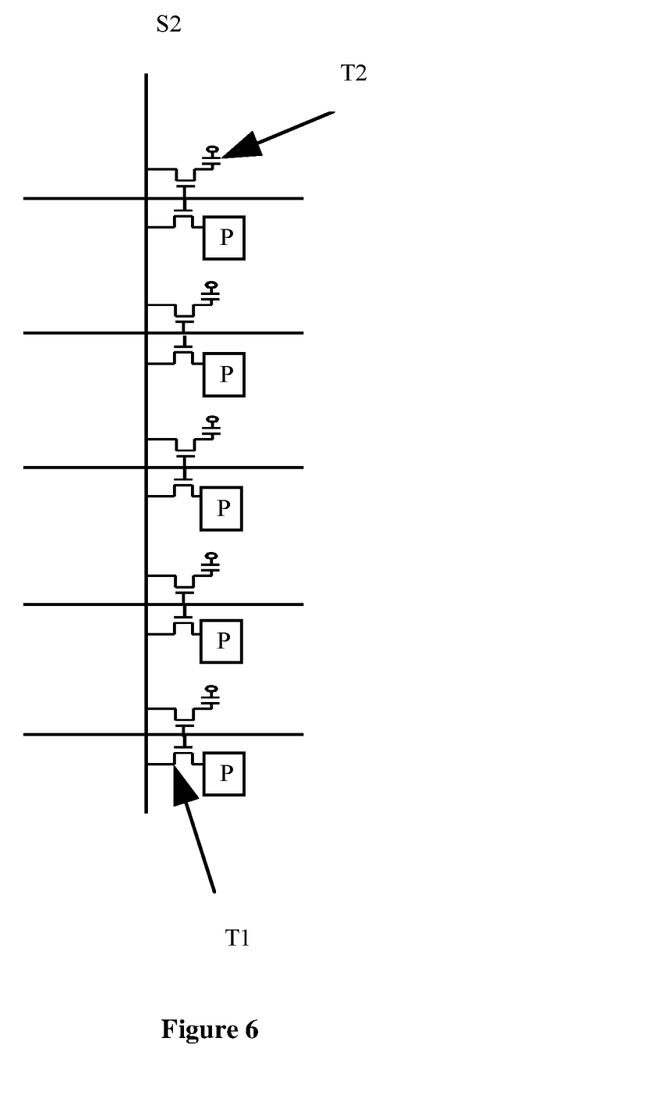
FIG. 6 is a layout diagram of pixel thin film transistors and touch-control-driving thin film transistors according to an embodiment of the disclosure.

The touch-control-driving thin film transistors T2 and the pixel thin film transistor T1 connected to a same data line 33 are provided on two sides of the data line 33 or on the same side of the data line 33. In the implementation of FIGS. 3-5, the touch-control-driving thin film transistors T2 and the pixel thin film transistor T1 connected to a same data line 33 are provided on a same side of the data line 33. In other implementation, as shown in FIG. 6, the touch-control-driving thin film transistor T2 and the pixel thin film transistor T1 connected to a same data line 33 are provided on two sides of the data line 33 respectively.

According to the embodiment, the common electrode layer may be provided between the pixel electrode P and the substrate 31, or the pixel electrode P may be provided between the common electrode layer and the substrate 31.

To reduce the thickness of the array substrate and simplify the fabrication process, the pixel thin film transistors T1 and the touch-control-driving thin film transistors T2 are fabricated on the same layer.

The pixel thin film transistors T1 and the touch-control-driving thin film transistors T2 connected to a same gate line 32 are controlled by the gate line 32 simultaneously. The turn-on voltages of thin film transistors T1 thin film transistors T2 connected to a same gate line 32 under a same gate scanning voltage are different. When the pixel thin film transistors T1 are on, the touch-control-driving thin film transistors T2 are off; and when pixel thin film transistors T1 are off, touch-control-driving thin film transistors T2 are on. Thus, a same gate line 32 may control the pixel thin film transistors T1 and the touch-control-driving thin film transistors T2 of the pixel units 34 in a same row simultaneously. Furthermore, the amount of controlling wires is reduced. Through inputting different scanning signals to the gate lines 32, the pixel thin film transistors T1 connected to the same gate line 32 are turned on, and the touch-control-driving thin film transistors T2 are turned off; or the pixel thin film transistors T1 are turned off, and the touch-control-driving thin film transistors T2 are turned on; or the pixel thin film transistors T1 and the touch-control-driving thin film transistors T2 are all turned off.

According to the embodiments of the disclosure, in a same touch-control unit Pad, the data lines 33 connected to the touch-control-driving thin film transistors T2 may be arranged consecutively; or, in a same touch-control unit Pad, the data lines 33 connected to the touch-control-driving thin film transistors T2 may be arranged at intervals.

The array substrate may be used in the RGB display-driving mode or RGBW display-driving mode, and the array substrate includes a red pixel unit R, a green pixel unit G and a blue pixel unit B. The touch-control-driving thin film transistor T2 is provided in the array substrate at the location corresponding to the red pixel unit R, or is provided in the array substrate at the location corresponding to the blue pixel unit B. Human eyes are sensitive to green light in images, if there is obvious loss in the green light, it is easier for observers to find out the differences in display effect. The forgoing settings may ensure the display effect without influencing the light transmission efficiency of green pixel units G in the array substrate.

In the array substrate according to the embodiment of the disclosure, during the display period, the gate lines 32 of the whole array substrate are scanned from the first one to the last one (forward scan), or from the last one to the first one (reverse scan). For any touch-control unit Pad, at any moment, when a specific gate line 32 is scanned, and a data signal for display is inputted to the pixel electrodes P through the data lines 33 corresponding to the gate line, a control signal used to turn on the touch-control-driving thin film transistors T2 may be provided for other gate lines 32 corresponding to the touch-control unit Pad that are not scanned, to turn on the touch-control-driving thin film transistors T2 and to provide a common signal for the touch-control unit Pad through the data lines 33 connected to the touch-control-driving thin film transistors T2 which are turned on. When an arbitrary gate line 32 is scanned, the touch-control-driving thin film transistors T2 connected to the gate line 32 are turned off, and the pixel thin film transistors T1 are turned on.

In FIG. 3, when a first gate line G1 is scanned, pixel thin film transistors T1 connected to the first gate line G1 are all turned on, touch-control-driving thin film transistors T2 connected to the first gate line G1 are all turned off. At this moment, the data signal for display is inputted to a first data line S1, the pixel electrode P in the first row and first column is charged, and the common signal is provided for a third data line S3, to realize the display in the pixel unit 34 corresponding to the pixel electrode P in the first row and first column After the input of the data signal for display on the first data line S1 is finished, the data signal for display is inputted to a second data line S2, the pixel electrode P in the first row and second column is charged, and the common signal is provided for the third data line S3, to realize the display in the pixel unit 34 corresponding to the pixel electrode P in the first row and second column.

After input of the data signal for display on the second data line S2 is finished, the first gate line G1 is turned off, a second gate line G2 is scanned, the data signal for display is provided for a third data line S3, the pixel electrode P in the first row and third column is charged, and at this time the common signal is provided to the first data line S1, to realize the display in the pixel unit 34 corresponding to the pixel electrode P in the first row and third column.

As described above, when the pixel electrode P in the first row and first column is charged, it is required to provide the common signal to the touch display electrode Pad through the touch-control-driving thin film transistors connected to the third data line S3; the common signal is inputted to the third data line S3, and since at this moment the pixel thin film transistors T1 connected to the first gate line G1 are all turned on, the pixel electrode P in the first row and third column is charged in response to the input of the common signal into the third data line S3, and the display in the pixel unit 34 corresponding to the pixel electrode P is influenced. To avoid this problem and to ensure a better display, in a same touch display electrode Pad, part of the pixel units 34 which are connected to the same data line 33 as the touch-control-driving thin film transistors T2 are located in the frame region; or, in the same touch display electrode Pad, at least part of the pixel units 34 which are connected to the same data line 33 as the touch-control-driving thin film transistors T2 are white pixel units. In the implementation in FIG. 3, the pixel unit in the first row and third column may be located in the frame region or to be white pixel unit.

During the touch-control period, there is no need to scan the gate lines 32. For any touch-control unit Pad, the control signal used to turn on the touch-control-driving thin film transistors T2 may be provided to the gate lines 32 corresponding to the touch-control unit Pad, to turn on the touch-control-driving thin film transistors T2 and to provide a touch-control signal to the touch-control unit Pad through the data lines 33 connected to the touch-control-driving thin film transistors T2 which are turned on.

In FIGS. 3-5, each touch-control unit Pad corresponds to four data lines 33 and five gate lines 32. For convenience of illustration, only one column of touch-control units Pad is shown. The number of rows and columns of touch-control units Pad, and the number of gate lines 32, data lines 33, and pixel electrodes P are not limited, which may be determined in part based on the panel size.

The drains of the touch-control-driving thin film transistors T2 connected to a same data line 33 are all electrically connected to the same touch-control unit Pad. Due to this connection, if a touch-control signal is inputted through a specific data line 33, the touch-control signal is provided to only one touch-control unit Pad to realize the touch detection. The data lines 33 connected to the touch-control-driving thin film transistors T2 may be used to provide data signal for display to the pixel electrodes P, to provide common signal to the touch-control unit Pad, and to provide touch-control signal to the touch-control unit Pad, and the three kinds of signals may be all transmitted through data lines, which greatly reduces the amount of wires, and simplifies the layout of the wiring.

It may be realized from the forgoing description that, in the array substrate according to the embodiment of the disclosure, the common electrode layer is partitioned into a plurality of touch-control units Pad, and the self-capacitive touch detection may be performed. The data lines 33 of the pixel units 34 in the array substrate may be reused as wires for the touch-control units Pad, to provide the common signal or touch-control signal for the touch-control units Pad. Thus there is no need to deposit a metal layer separately to fabricate the wires for the touch-control units Pad, which simplifies the fabrication process, and reduces the fabrication cost and thickness of the panel.

Figure 7:
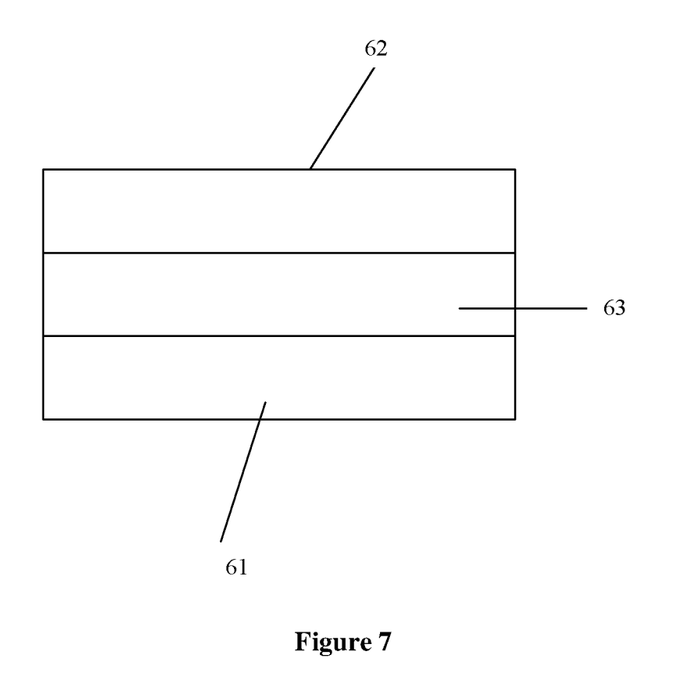
FIG. 7 is a structural diagram of a self-capacitive touch display panel according to an embodiment of the disclosure.

A self-capacitive touch display panel is further provided according to the embodiment of the disclosure. Referring to FIG. 7, a structural diagram of a self-capacitive touch display panel according to an embodiment of the disclosure is shown. The self-capacitive touch display panel includes: an array substrate 61 and a color film substrate 62 disposed oppositely to the array substrate 61; a display medium 63 located between the array substrate 61 and the color film substrate 62. The display medium 63 may be a liquid crystal layer.

The self-capacitive touch display panel may be used for electronic devices such as cell phone, computer and television. The self-capacitive touch display panel according to the embodiment of the disclosure, the array substrate 61 may be any of the array substrates in the forgoing embodiments, thus the fabrication process is simple, low cost, and the place-and-route is simple.

When driving the self-capacitive touch display panel, the operating time of the touch display panel includes a display period and a touch-control period. The display period and the touch-control period alternate, to achieve the image display and touch detection performed in time-sharing manner.

During the touch-control period, the touch-control-driving thin film transistors are turned on, and the touch-control signal is transmitted to the touch-control unit through the touch-control-driving thin film transistors. During the display period, the data signals for display are inputted to a plurality of data lines in turn, and the data signals for display are transmitted to corresponding pixel electrodes through the pixel thin film transistors; in a same touch-control unit, at the same moment, at least one data line transmits a common signal to the touch-control unit through the touch-control driving transistor.

To control the pixel thin film transistors and touch-control-driving thin film transistors in pixel units in a same row through a same gate line, it is required that the pixel thin film transistors and touch-control-driving thin film transistors connected to the same gate line are in opposite on/off status under a same scanning signal. Since p-channel metal-oxide-semiconductor (PMOS) is turned on at a low potential and turns off at a high potential, while n-channel metal-oxide-semiconductor (NMOS) is turned on at a high potential and turns off at a low potential, for the pixel thin film transistor and touch-control-driving thin film transistor in the embodiment of the disclosure, one may be PMOS and the other may be NMOS. In a case that the voltage signal inputted from the gate line 32 is higher than the threshold voltage of NMOS, the NMOS is turned on, and the PMOS turns off; in a case that the voltage signal inputted from the gate line is lower than the threshold voltage of PMOS, the NMOS turns off, and the PMOS is turned on; in a case that the voltage signal inputted from the gate line is between the threshold voltage of NMOS and the threshold voltage of PMOS, both the NMOS and PMOS are turned off.

In a case that the pixel thin film transistor is NMOS, and the touch-control-driving thin film transistor is PMOS, during the touch-control period, the PMOS is turned on, and the touch-control signal is transmitted to the touch-control unit through the PMOS; during the display period, the data signals for display are inputted to a plurality of data lines in turn, and are transmitted to corresponding pixel electrodes through the NMOS; in a same touch-control unit, at the same moment, at least one data line transmits a common signal to the touch-control unit through PMOS.

In a case that the pixel thin film transistor is PMOS, and the touch-control-driving thin film transistor is NMOS, during the touch-control period, the NMOS is turned on, and the touch-control signal is transmitted to the touch-control unit through the NMOS; during the display period, the data signals for display are inputted to a plurality of data lines in turn, and are transmitted to corresponding pixel electrodes through the PMOS; in a same touch-control unit, at the same moment, at least one data line transmits the common signal to the touch-control unit through NMOS.

To ensure synchronization of common signals of respective touch-control units in the self-capacitive touch display when performing display, and to ensure the display effect, during the display period: when the data signal for display is provided, through a data line connected to a touch-control-driving thin film transistor, to a corresponding touch-control unit, the common signal is simultaneously inputted to the other data lines connected to the touch-control-driving thin film transistor. When there is no data line connected to the touch-control-driving thin film transistor providing the data signal for display to the corresponding touch-control unit, the common signal is simultaneously inputted to all the data lines connected to the touch-control-driving thin film transistor.

Taking the self-capacitive touch display panel using the array substrate shown in FIG. 5 for example the touch-control-driving thin film transistor T2 is PMOS, and the pixel thin film transistor T1 is NMOS.

During the display period, in a case that the pixel electrode P (the pixel electrode P is referred as pixel electrode P22) connected to the second gate line G2 and the second data line S2 needs to be charged for writing the data signal for display, a high potential is inputted to the second gate line G2. All the pixel thin film transistors T1 connected to the second gate line G2 are turned on at this moment, and the data signal for display is inputted to pixel electrode P22 through the second data line S2. At the same time, a low potential is inputted to at least one of the remaining gate lines 32 in the touch-control unit Pad corresponding to pixel electrode P22, touch-control-driving thin film transistors T2 connected to the gate lines 32, to which the low potential is inputted, are turned on, the pixel thin film transistors T1 are turned off, the common signal is inputted to the other data lines 33 except the second data line S2, and the common signal is inputted to the touch-control unit Pad through the touch-control-driving thin film transistors T2 which are turned on to achieve normal display. When the common signal is inputted, the common signal may be inputted to all the other data lines 33, or the common signal may be only inputted to the data lines 33 connected to the touch-control-driving thin film transistors T2 which are turned on.

During the touch-control period, for any touch-control unit Pad, the low potential is inputted to at least one corresponding gate line 32, touch-control-driving thin film transistors T2, connected to the gate line(s) 32 to which the low potential is inputted, are turned on, the pixel thin film transistors are turned off, and the touch-control signal may be inputted to the data lines 33 connected to the touch-control-driving thin film transistors T2 which are turned on, to provide the touch-control signal to the touch-control unit Pad and to realize the touch detection. It can be learned from the forgoing description that, the self-capacitive touch display panel according to the embodiments of the disclosure uses the array substrate according to the forgoing embodiments, and may achieve the time-sharing driving of touch detection and image display. The data lines connected to the touch-control-driving thin film transistors may be used to input common signal, touch-control signal, and data signal for display in a time-sharing manner, thus there is no need to deposit a metal layer separately to fabricate the wires for the touch-control units, which simplifies the layout of the wiring and the fabrication process, and reduces the fabrication cost and thickness of the panel.

The forgoing description of the embodiments of the disclosure is to allow those skilled in the art to implement or use the disclosure. A variety of modifications to the embodiments are apparent for those skilled in the art, and the general principles defined in the disclosure may be implemented in other embodiments without departing from the scope of the invention. Hence, the disclosure is not limited to the embodiments disclosed in the disclosure, but conforms to a widest scope consistent with the principles and novel features in the disclosure.

What is claimed is:

1. An array substrate for a self-capacitive touch display panel, comprising:
a substrate, wherein a plurality of gate lines, a plurality of data lines, and a common electrode layer are provided on the substrate, and the gate lines and the data lines are insulated from each other and cross each other to define a plurality of pixel units arranged in an array; wherein:
each pixel unit comprises a pixel thin film transistor and a pixel electrode;
the common electrode layer comprises a plurality of touch-control units insulated from each other, and each touch-control unit corresponds to a plurality of the pixel units;
a plurality of touch-control-driving thin film transistors are provided on the substrate;
each touch-control unit is connected to a drain of at least two touch-control-driving thin film transistors, wherein gates of the two touch-control-driving thin film transistors are connected to different gate lines, and sources of the two touch-control-driving thin film transistors are connected to different data lines.

2. The array substrate according to claim 1, wherein the plurality of touch-control units are arranged in an array.

3. The array substrate according to claim 2, wherein in one pixel unit, at most one touch-control-driving thin film transistor is provided correspondingly.

4. The array substrate according to claim 3, wherein in each pixel unit, a gate of the pixel thin film transistor is connected to an adjacent gate line, a source of the pixel thin film transistor is connected to an adjacent data line, and a drain of the pixel thin film transistor is connected to a pixel electrode; and
the touch-control-driving thin film transistor and the pixel thin film transistor connected to a same data line are provided on two sides of the data line respectively or on a same side of the data line.

5. The array substrate according to claim 1, wherein the common electrode layer is provided between the pixel electrode and the substrate; or
the pixel electrode is provided between the common electrode layer and the substrate.

6. The array substrate according to claim 1, wherein the touch-control-driving thin film transistor and the pixel thin film transistor are provided on a same layer.

7. The array substrate according to claim 1, wherein turn-on voltages of the touch-control-driving thin film transistor and the pixel thin film transistor connected to a same gate line are different at a same moment.

8. The array substrate according to claim 1, wherein in a same touch-control unit, the data lines connected to the touch-control-driving thin film transistors are arranged consecutively;
or, in the same touch-control unit, the data lines connected to the touch-control-driving thin film transistors are arranged at intervals.

9. The array substrate according to claim 1, wherein the array substrate comprises a red pixel unit, a green pixel unit and a blue pixel unit; and
the touch-control-driving thin film transistor is provided in the array substrate at a location corresponding to the red pixel unit, or is provided in the array substrate at a location corresponding to the blue pixel unit.

10. The array substrate according to claim 1, wherein in a same touch-control unit, part of the pixel units connected to a same data line as the touch-control-driving thin film transistor are located in frame region;
or, in the same touch-control unit, at least part of the pixel units connected to the same data line as the touch-control-driving thin film transistor are white pixel units.

11. A self-capacitive touch display panel, comprising:
an array substrate;
a color film substrate disposed oppositely to the array substrate; and
a display medium provided between the array substrate and the color film substrate;
the array substrate comprising:
a substrate, wherein a plurality of gate lines, a plurality of data lines, and a common electrode layer are provided on the substrate, and the gate lines and the data lines are insulated from each other and cross each other to define a plurality of pixel units arranged in an array; wherein:

each pixel unit comprises a pixel thin film transistor and a pixel electrode;

the common electrode layer comprises a plurality of touch-control units insulated from each other, and each touch-control unit corresponds to a plurality of the pixel units;

a plurality of touch-control-driving thin film transistors are provided on the substrate;

each touch-control unit is connected to a drain of at least two touch-control-driving thin film transistors, wherein gates of the two touch-control-driving thin film transistors are connected to different gate lines, and sources of the two touch-control-driving thin film transistors are connected to different data lines.

12. The self-capacitive touch display panel according to claim 11, wherein operating time of the touch display panel comprises a display period and a touch-control period;

during the touch-control period, the touch-control-driving thin film transistors are turned on, and a touch-control signal is transmitted to the touch-control unit through the touch-control-driving thin film transistors; and during the display period, data signals for display are inputted to a plurality of data lines in turn and are transmitted to corresponding pixel electrodes through the pixel thin film transistors, and in a same touch-control unit, at a same moment, at least one data line transmits the common signal to the touch-control unit through the touch-control-driving transistor.

13. The self-capacitive touch display panel according to claim 12, wherein the pixel thin film transistor is NMOS, and the touch-control-driving thin film transistor is PMOS.

14. The self-capacitive touch display panel according to claim 13, wherein during the touch-control period, the PMOS is turned on, and the touch-control signal is transmitted to the touch-control unit through the PMOS; and during the display period, the data signals for display are inputted to a plurality of data lines in turn, and are transmitted to corresponding pixel electrodes through the NMOS, and in a same touch-control unit, at the same moment, at least one data line transmits the common signal to the touch-control unit through the PMOS.

15. The self-capacitive touch display panel according to claim 12, wherein the pixel thin film transistor is PMOS, and the touch-control-driving thin film transistor is NMOS.

16. The self-capacitive touch display panel according to claim 15, wherein during the touch-control period, the NMOS is turned on, and the touch-control signal is transmitted to the touch-control unit through the NMOS; and during the display period, the data signals for display are inputted to a plurality of data lines in turn and are transmitted to corresponding pixel electrodes through the PMOS, and in the same touch-control unit, at the same moment, at least one data line transmits the common signal to the touch-control unit through the NMOS.

17. The self-capacitive touch display panel according to claim 12, wherein during the display period:

when the data signal for display is provided, through one data line connected to the touch-control-driving thin film transistor, to a corresponding touch-control unit, the common signal is inputted to other data lines connected to the touch-control-driving thin film transistor simultaneously; and when there is no data line connected to the touch-control-driving thin film transistor providing the data signal for display to the corresponding touch-control unit, the common signal is inputted to all the data lines connected to the touch-control-driving thin film transistor simultaneously.

* * * * *